W. J. LUTTRELL.
SPRING WHEEL FOR VEHICLES.
APPLICATION FILED APR. 8, 1913.
1,087,960.
Patented Feb. 24, 1914.
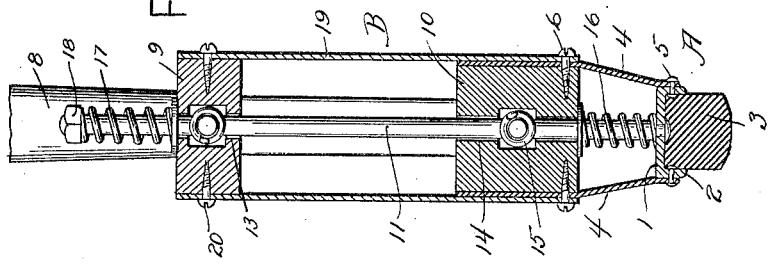
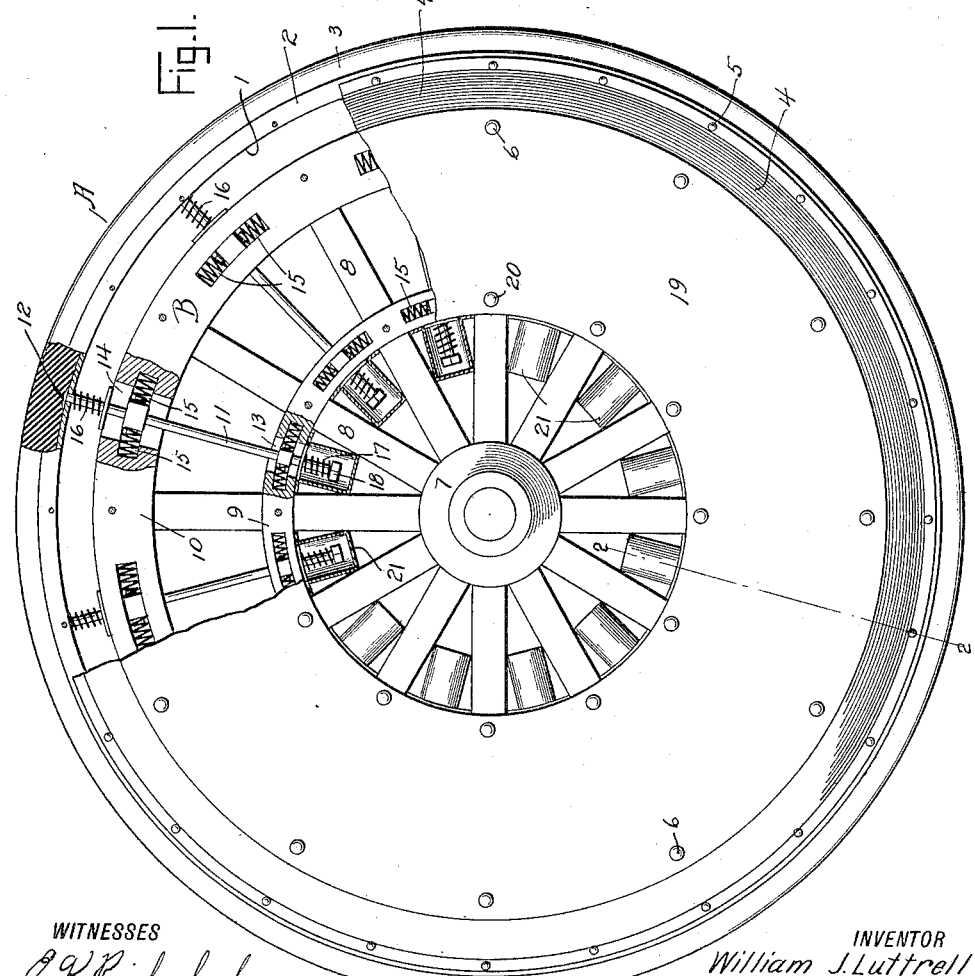
WITNESSES
INVENTOR
William J. Luttrell
BY
ATTORNEYS

UNITED STATES PATENT OFFICE.

WILLIAM J. LUTTRELL, OF HONEY GROVE, TEXAS.

SPRING-WHEEL FOR VEHICLES.

1,087,960.   Specification of Letters Patent.   Patented Feb. 24, 1914.

Application filed April 8, 1913. Serial No. 759,618.

*To all whom it may concern:*

Be it known that I, WILLIAM J. LUTTRELL, a citizen of the United States, and a resident of Honey Grove, in the county of Fannin and State of Texas, have invented a new and Improved Spring-Wheel for Vehicles, of which the following is a full, clear, and exact description.

This invention relates to wheels of that type consisting of an inner and an outer section of annular form, with spring cushioning devices between the sections for insuring easy running of the vehicle by the spring devices absorbing shocks and vibrations.

The invention has for one of its objects to improve and simplify the construction and operation of wheels of this character, so as to be reliable and efficient in use, comparatively inexpensive to manufacture and so designed as to provide an effective cushioning action.

Another object of the invention is the provision of improved connecting and cushioning means between the inner and outer sections of the wheel, whereby the two sections can shift with respect to their centers without undue strain or friction.

An additional object is the employment of simple and effective means for excluding mud, dirt and water from the interior of the wheel.

With these objects in view, and others as will appear as the description proceeds, the invention comprises various novel features of construction and arrangement of parts which will be more fully described hereinafter and set forth with particularity in the claim appended hereto.

In the accompanying drawings, which illustrate one embodiment of the invention, and wherein similar reference characters are employed to designate corresponding parts throughout both the views, Figure 1 is a side view of a wheel with portions broken away to show the details of construction; and Fig. 2 is an enlarged sectional view on the line 2—2 of Fig. 1.

Referring to the drawings, A designates the outer or tire section and B the inner or body section of the wheel. The tire section A comprises a felly or rim 1 of channel cross-section, and between the flanges 2 thereof is set a rubber tread element or tire proper 3. The annular outer section is of somewhat larger internal diameter than the external diameter of the inner section and the gap between the two sections of the wheel is closed on both sides by rings 4 of leather or equivalent material, to form mud guards, whereby dirt is prevented from entering the wheel. The two rings of leather 4 are secured by fastenings 5 to the felly 2 and by fastenings 6 to the inner section of the wheel, and these rings of leather will normally have sufficient slackness to permit the two sections of the wheel to freely move relatively to each other as the wheel passes over obstructions and the like in the roadway, but instead of leather, rubber or other elastic material may be employed.

The inner section B comprises a hub 7, spokes 8 and concentric rings 9 and 10, the latter being connected with the ends of the spokes and the former being disposed intermediate the hub and outer ring. The two sections of the wheel are operatively united by radial connecting elements 11 in the form of rods which have their outer ends 12 connected with the outer section A, and from which the elements extend inwardly through both rings 9 and 10. The rings are provided with slots 13 and 14 which lie in the plane of the wheel so as to provide for lateral movement of the connecting elements 11 with respect to the inner section of the wheel, and within each ring are springs 15 disposed at opposite sides of each element 11, to yieldingly oppose relative movement of the inner elements 11 and inner section B of the wheel. Interposed between the outer section A and the ring 10 of the inner section are cushioning springs 16 on each element 11, and also on each element at the inner end thereof is a spring 17 interposed between the inner ring 9 and head 18 on the element 11. These springs permit the two sections to shift eccentrically, one with respect to the other, and at the same time take up shocks submitted to the wheel in traveling over rough surfaces. The space between the two rings 9 and 10 is inclosed by side plates 19 of annular form, which overlie the mud guards 4. These plates are fastened to the rings 9 and 10 by fastenings 6 and 20. The inner ends of the connecting elements 11 are inclosed in housings or caps 21 disposed between the spokes 8 and fastened to the inner ring 9. By reason of the mud guards 4, plates 19 and caps 21, it is practically impossible for dust and mud to work into the wheel.

From the foregoing description taken in connection with the accompanying drawings, the advantages of the method of operation and of the device shown will be readily understood by those skilled in the art to which the invention appertains, and while I have described the device which I now consider to be the best embodiment thereof, I desire to have it understood that the device shown is merely illustrative, and that such changes may be made when desired as are within the scope of the appended claim.

Having thus described my invention, I claim as new and desire to secure by Letters Patent:

In a wheel, the combination of a hub, spokes thereon, concentric rings fastened to the spokes and having alining radial slots and lateral openings leading from the slots, rods slidably mounted longitudinally and laterally in each pair of alining slots, opposed springs in each slot for resisting lateral movement of the said rods, heads on the inner ends of the rods, springs interposed between the inner ring and said heads for opposing outward movement of the rods, an outer or tire ring secured to the outer ends of the rods, springs on the said rods and interposed between the tire ring and the outer ring on the spokes, flexible mud guards fastened to the tire ring and outer ring on the spokes and bridging the space between said rings, and plates secured to the sides of the said concentric rings on the spokes and closing the said openings to exclude mud from the said springs, and caps secured to the inner ring for covering the inner ends of the said rods and springs thereon.

In testimony whereof I have signed my name to this specification in the presence of two subscribing witnesses.

WILLIAM J. LUTTRELL.

Witnesses:
DELMER S. TAYLOR,
R. M. McCLEARY.

---

Copies of this patent may be obtained for five cents each, by addressing the "Commissioner of Patents. Washington, D. C."